United States Patent [19]

Kytta et al.

[11] Patent Number: 4,522,031
[45] Date of Patent: Jun. 11, 1985

[54] FLUID PRESSURIZING DEVICE

[75] Inventors: Oswald O. Kytta; Lloyd G. Bach, both of South Bend, Ind.

[73] Assignee: The Bendix Corporation, Southfield, Mich.

[21] Appl. No.: 274,572

[22] Filed: Jun. 17, 1981

[51] Int. Cl.³ .................... F15B 13/16; F16J 10/02
[52] U.S. Cl. ................... 60/547.1; 91/369 A; 92/128; 92/169
[58] Field of Search .......... 91/369 A, 369 B, 369 R; 60/547.1; 92/169, 128

[56] References Cited

U.S. PATENT DOCUMENTS

| 4,334,459 | 6/1982 | Riedel et al. | 91/369 B |
| 4,339,921 | 7/1982 | Schanz | 60/547.1 |
| 4,347,779 | 9/1982 | Belart | 91/369 A |

FOREIGN PATENT DOCUMENTS

| 156982 | 12/1979 | Japan | 91/369 A |
| 2037918 | 7/1980 | United Kingdom | 91/369 A |

*Primary Examiner*—Paul E. Maslousky

*Attorney, Agent, or Firm*—Leo H. McCormick, Jr.; Ken C. Decker

[57] ABSTRACT

A fluid pressurizing device 10 having a master cylinder 12 with a cylindrical projection 52 that extends through the housing of a brake booster 14. The housing of the brake booster 14 has a front shell 56 located on a shoulder 54 of the cylindrical projection 52 and a rear shell 140 located against a shoulder 150. A nut carried by the cylindrical projection 52 engages the rear shell 140 to compress a bead 111 of a diaphragm 110 against a shoulder 57 on the front shell 56. A sleeve 80 connected to a hub member 70 retains a bead 108 of diaphragm 110 and bead 90 of a diaphragm 92 connected to the cylindrical projection 52. In response to an input force, a valve assembly 136 controls the development of a pressure differential across the diaphragms 92 and 110. The pressure differential acts on and moves the diaphragms 92 and 110 toward the first shell 56. Movement of the diaphragms 92 and 110 is carried through the hub member 70 which moves in slots 62 and 64 in the cylindrical projection 52 to provide a piston assembly 30 in the master cylinder 12 with a force to pressurize fluid therein and develop an output fluid pressure to effect a brake application.

8 Claims, 3 Drawing Figures

FLUID PRESSURIZING DEVICE

This invention relates to a fluid pressurizing device wherein a first housing has a cylindrical projection that extends through a second housing. A fastener attached to the cylindrical projection engages the second housing causing a bead of a diaphragm to be compressed between first and second shells and seal the second housing from the surrounding environment. Thereafter, a pressure differential created across a wall in the second housing provides an operational force that moves a piston assembly in the first housing to produce a fluid output force.

In known fluid pressurizing devices such as illustrated in U.S. Pat. No. 4,005,639, the first housing is usually connected to the first shell and the second shell is connected to a stationary structure such as the firewall of a vehicle.

Later as disclosed in U.K. Patent Application No. GB 2,025,549 structure is shown whereby the reactionary forces that develop during a brake application are carried through bolts that extend from the first housing through the second housing. The movable wall is mounted on the bolts. Unfortunately during some operational conditions, the seals between the movable wall and bolts can create high frictional resistance to reduce the smooth operation of the fluid pressurizing device.

In an effort to reduce the frictional resistance, a sleeve structure such as disclosed in German DEOS No. 2922299 was developed. The sleeve structure provided mounting brackets for the attachment of the brake booster to a master cylinder and the fire wall of a vehicle. Unfortunately with this structure because of the various types and sizes of master cylinders and under the dash space adjacent the firewall, such mounting brackets are undesirable.

SUMMARY OF THE INVENTION

The invention as claimed is intended to provide a solution to the mounting problem. The housing of the master cylinder has a cylindrical projection that extends through the housing of the brake booster. A first fastener carried by the cylindrical projection engages the housing of the brake booster to urge a front shell thereof against a shoulder on the master cylinder while at the same time compressing a bead of a diaphragm assembly between the front and a rear shell to seal this housing from the surrounding environment. A second fastener carried by the cylindrical projection attaches the master cylinder brake booster to the firewall of a vehicle.

Any advantage of this invention results in the direct connection of the master cylinder of the fluid pressurizing apparatus to the firewall of a vehicle.

Another advantage of this invention results from the attachment of the brake booster on the cylindrical projection by a first fastener and the cylindrical projection of the master cylinder to the firewall such that the reactionary force that develops in the master cylinder is carried into the firewall without effecting the operation of the brake booster.

A still further advantage of this invention occurs through the attachment of the brake booster to the cylindrical projection of a master cylinder by a first fastener since the shells that make up the brake booster need not be lanced together since the reactionary force generated in the master cylinder are directly carried into the firewall through the cylindrical projection.

It is an object of this invention to provide a method of assembling a fluid pressurizing device whereby a brake booster carried on a cylindrical projection of a master cylinder is sealed from the surrounding environment.

It is a further object of this invention to provide a fluid pressurizing device including a master cylinder and a brake booster with a single fastener arrangement that connects the brake booster to the master cylinder and the master cylinder to a support structure.

These advantages and objects should be apparent from reading this specification in conjunction with the drawings.

DETAILED DESCRIPTION OF THE INVENTION

Figure 1:
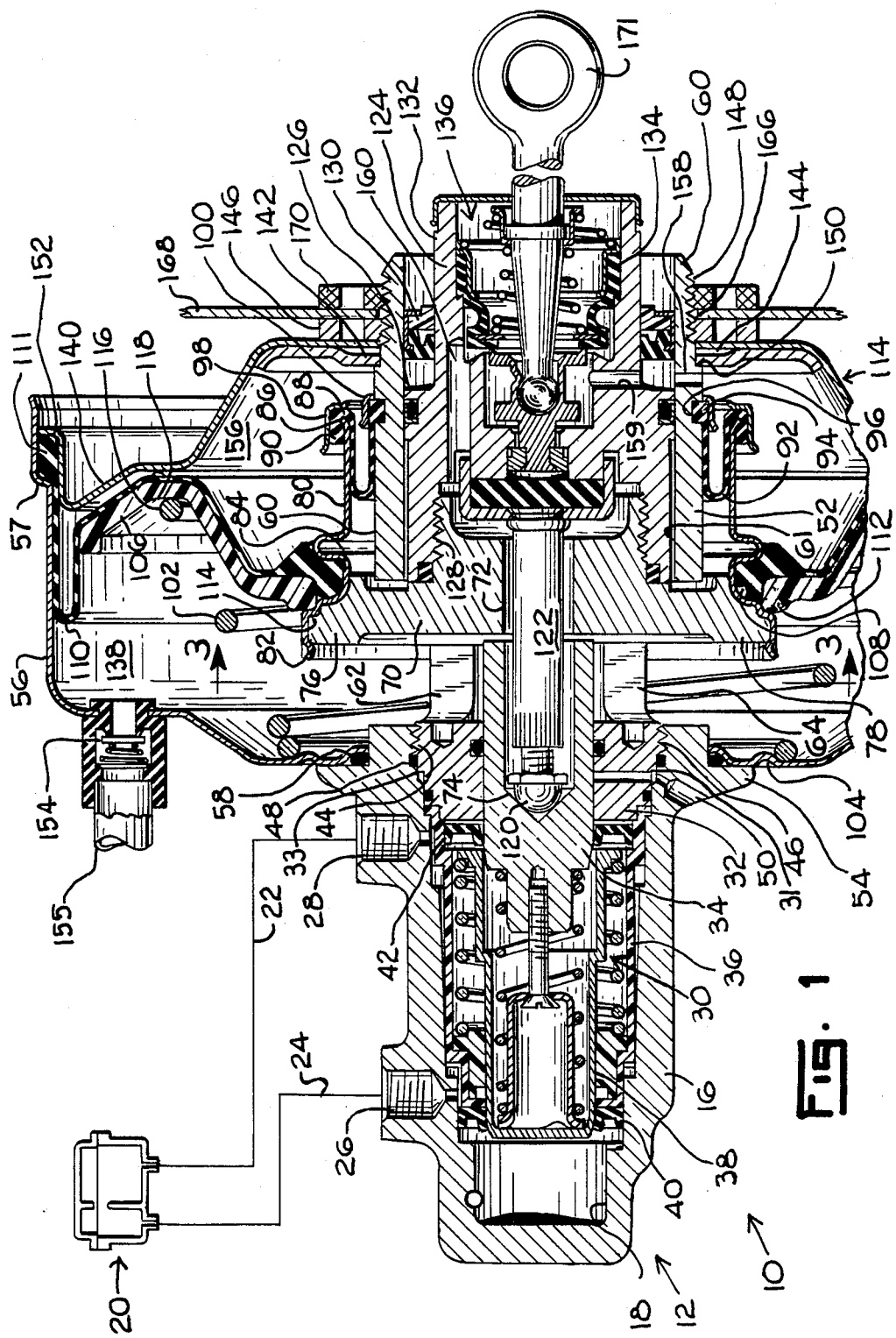
FIG. 1 is a schematic illustration of a fluid pressurizing device made according to the principles of this invention.

The fluid pressurizing device 10 shown in FIG. 1 includes a master cylinder 12 and a brake booster 14.

The master cylinder 12 has a housing 16 with a bore 18. Bore 18 is connected to a reservoir 20 by conduits 22 and 24 attached to compensator ports 26 and 28.

A piston assembly 30 of the type fully disclosed in U.S. Pat. No. 4,249,381 is located in bore 18. A bearing member 32 which surrounds a first piston 34 in the piston assembly 30 engages a sleeve 36. Threads 44 on the periphery of the bearing member 32 are matched with threads 46 on housing 18. A torque is applied to the bearing member 32 to move a face 31 thereon against a shoulder 33 and thereby position the piston assembly 30 in bore 18 such that stationary seal 40 associated with piston 38 is located adjacent compensator port 26 and stationary seal 42 associated with piston 34 is located adjacent compensator port 28. A groove 48 located in housing 16 which is connected to threads 44 has a passage 50 connected to the surrounding environment to prevent fluid from being transmitted from the bore 18 of the master cylinder 12 into the vacuum booster 14.

The master cylinder housing 16 has a cylindrical projection 52 that extends through the housing of the brake booster 14. A rib 54 which extends from housing 16 provides a stop for a cup shaped front shell 56 of the vacuum brake booster 14.

A seal 58 is located on peripheral guide surface 60 before the first shell is positioned adjacent shoulder 54.

The cylindrical projection 52 has slots 62 and 64 that extends from adjacent shoulder 54 to approximately the midpoint between the shoulder 54 and end 68.

Figure 2:
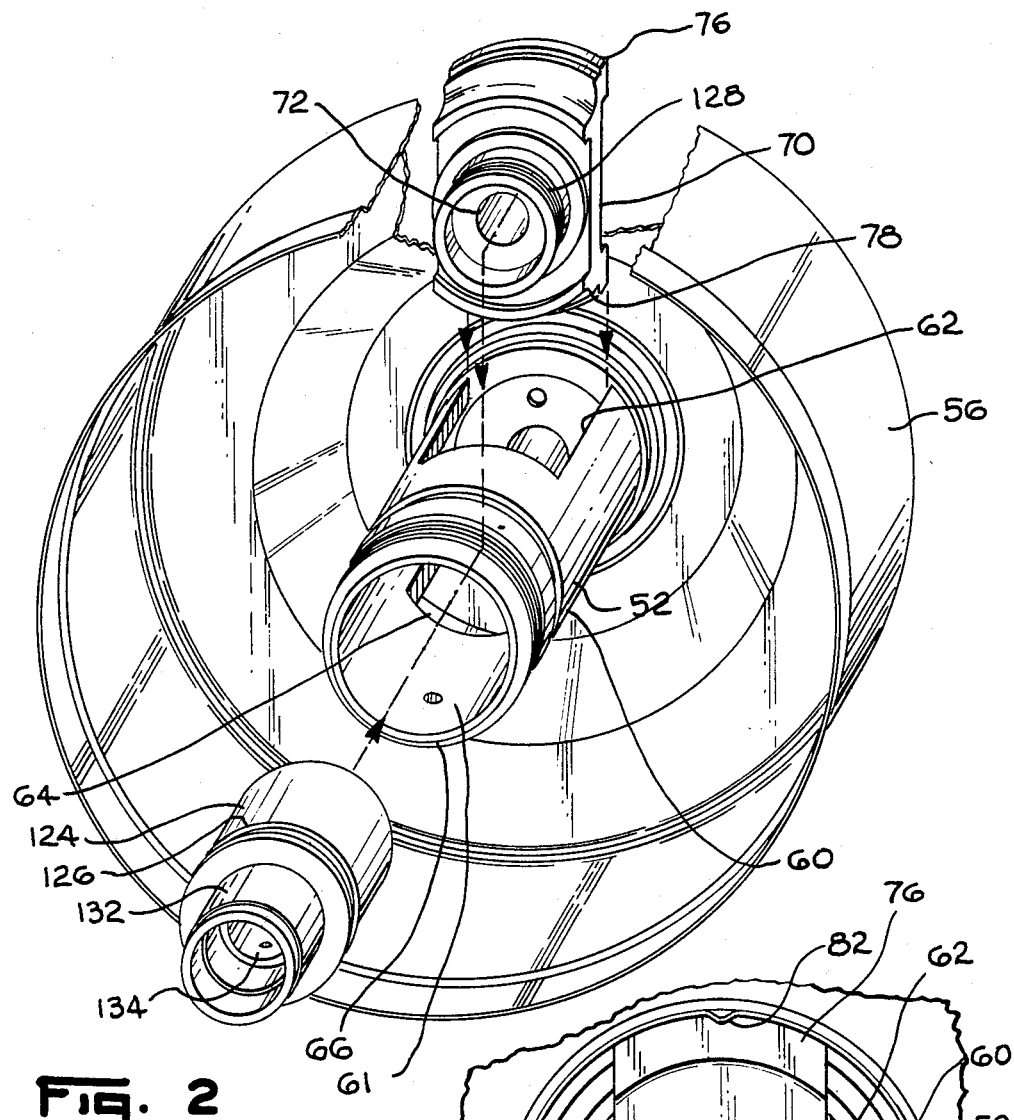
FIG. 2 is a schematic illustration of the steps of installing a hub member in the cylindrical projection extending from the master cylinder after the front shell of the brake booster has been positioned against a shoulder on the cylindrical projection.

A hub member 70 is inserted into slots 62 and 64 as best shown in FIG. 2 such that opening 72 is aligned with socket 74 in piston 34. In this position peripheral surfaces 76 and 78 extend above peripheral surface 60 on the cylindrical projection an equal distance.

Figure 3:
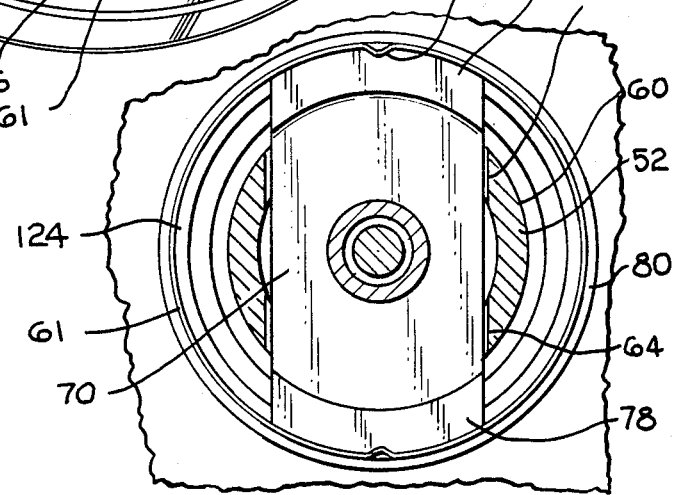
FIG. 3 is a sectional view taken along line 3-3 of FIG. 1.

Thereafter, an end 82 of sleeve 80 is snapped over the peripheral surfaces or lips 76 and 78, as shown in FIGS. 1 and 3. Sleeve 80 which has a groove 84 located therein adjacent end 82 has a rib 86 on end 88. A bead 90 of diaphragm 92 is affixed to rib 86 and a bead 94 is located in groove 96 on the cylindrical projection 52.

A first retainer 98 engages bead 90 to hold the same against rib 86 and a second retainer 100 engages bead 94 to hold the same in groove 96.

Thereafter, an end of a return spring 102 is placed on rib 104 on the first shell 56 and backing plate 106 is placed on sleeve 80.

A bead 108 on diaphragm 110 which is snapped into groove 84 urges rib 112 on backing plate 106 against shoulder 114 on sleeve 80. At the same time end 116 of spring 102 is located in recess 118 on backing plate 106 to initially center the hub member 70 in the center of bore 61 of the cylindrical projection 52.

Thereafter, end 120 of push rod 122 is moved through opening 72 in hub member 52 and into engagement with socket 74 in piston 34.

A cylindrical body 124, as shown in FIG. 2, inserted into bore 61 has a guide surface 126 that engages the bore 61 and an end that is mated with threads 128 on the hub member 70. Bearing seal 130 engages surface 132 on the cylindrical body 124 to provide a two point contact for assuring that the hub member 70 is aligned in the center of bore 61 in cylindrical projection 52.

The cylindrical body 124 has a bore 134 therein which retains a control valve assembly 136 of a type fully disclosed in U.S. Pat. application No. 205,480 to control the communication between a chamber 138 formed by the first shell 56, diaphragm 110, sleeve 80, diaphragm 92, hub member 70 and cylindrical body 124.

A second or rear shell 140 placed on the cylindrical projection 52 has a face 142 which holds a seal 144 against the shell 14.

A first fastener or nut 146 engages threads 148 on the end 60 of the cylindrical projection 52. The nut 146 is torqued to bring face 142 into engagement with shoulder 150 on the cylindrical projection 52. At the same time flange 152 on disc-shaped shell 140 engages bead 111 on diaphragm 110 to urge the same against shoulder or rib 57 adjacent the end of rear shell 140 to form a seal between the interior of the second housing and the surrounding environment. The free standing height of the front or first shell 56, thickness of bead 111, and the rear or second shell is greater than the distance between shoulders 54 and 150 on the cylindrical projection 52. Therefore, when nut 146 moves the face 142 into engagement with shoulder 150, the front and rear shells 56 and 140 are placed in compression.

Thereafter, this assembly is connected to a source of vacuum through conduit 155 to evacuate air from the brake booster 14.

With the valve assembly 136 in the release position as shown in FIG. 1, air from chamber 156 formed by diaphragm 110, sleeve 80, diaphragm 92, cylindrical projection 52, and rear shell 140, flows through passage 158, bore 134, passage 160 into chamber 138. With vacuum in chambers 138 and 156, a pressure differential is created with the air in the surrounding environment. Since bead 11 is only held between shoulder 57 and flange 152 by the compressive force of the fastener 146 acting on the second shell 140, the level of the vacuum is measured after a period of time to determine if a leak is present at the seals 58, 111 and 144. If any of the vacuum level is maintained for a predetermined time period, the fluid pressure assembly 10 is accepted for installation on a vehicle.

The vehicle manufacturer thereafter locates the cylindrical projection 52 in an opening 166 in a firewall 168.

The compensator ports 26 and 28 are aligned on the top of bore 18 and a second fastener or nut 170 is placed on threads 148. This second nut 170 is torqued against the firewall 168 and the fluid pressurizing device 10 is installed in the vehicle.

In the rest position, after the installation on the firewall 168, return spring 102 acts on backing plate 106 to hold diaphragm 110 against the second shell 140. Since sleeve 80 is attached to hub member 70 the cylindrical body 60 is also moved to the rest position.

When the vehicle is in operation, vacuum in connected to the brake booster 14 through conduit 155 connected to check valve 154.

When the operator desires to effect a brake application, an input force is applied to push rod 171 to activate the control valve assembly 136 and interrupt vacuum communication to bore 134 through passage 160 and initiate the communication of air to chamber 156 by way of bore 134, and passages 158 and 159. With air in chamber 156, a pressure differential is created across diaphragms 92 and 110 with the vacuum in chamber 138. This pressure differential acts on backing plate 106 and sleeve 80 to develop a force that is carried into hub member 70 for distribution into push rod 122.

The push rod 122 acts on the piston assembly 30 to pressurize the fluid in master cylinder 12 and produce a fluid output that is transmitted to the wheel brakes to institute a brake application.

The reaction to the development of the fluid output in the master cylinder 12 is carried through the cylindrical projection 52 into the firewall 168. The pressure differential acts on diaphragm 110 adjacent bead 111 retains the vacuum seal in chamber 138 while diaphragm 92 is urged toward the peripheral surface 60 of the cylindrical projection to retain the vacuum seal at this connection. The tensile strength of shell 140 is such that when air is present in chamber 156, flange 152 still holds bead 111 against shoulder 57.

When the brake application has been achieved, the input force on push rod 70 is removed and return springs in valve assembly 136 terminate the flow path for air to chamber 156 to allow vacuum present in chamber 138 to evacuate air therefrom and allow return spring 102 to move the movable wall or diaphragms 92 and 110 to the rest position as shown in FIG. 1.

We claim:

1. A method of assembling a fluid pressurizing apparatus comprising the steps of:
   placing a piston assembly in a bore of a substantially cylindrical housing, said cylindrical housing having a peripheral guide surface with a first shoulder separated from a second shoulder, said cylindrical housing having first and second slots that extend from said bore to said guide surface;
   locating a cup-shaped shell on said peripheral surface with an end wall positioned against said first shoulder, said cup-shaped shell having a cylindrical section extending from said end wall, said cylindrical section having a flange located thereon;
   moving a hub member through said first and second slots until an opening therein is aligned with said piston assembly and peripheral lips thereon uniformly extend above said guide surface;
   passing a push rod through said opening in said hub until an end thereof engages said piston assembly;

attaching a valve housing to said hub member;

securing a first end of a sleeve to said peripheral lips on said hub member, said sleeve having a second end and a groove thereon adjacent said first end;

locating a return spring on a guide on said first end wall of said cup-shaped shell;

locating a first bead on a first diaphragm assembly in said groove of the sleeve and a second bead adjacent said flange on said cylindrical section of cup-shaped shell;

attaching a third bead on a second diaphragm assembly to said second end of said sleeve and a fourth bead on the second diaphragm to said cylindrical housing, said cup-shaped shell, piston assembly, first and second diaphragm assemblies, sleeve, and hub member defining a first chamber;

positioning a disc-shaped shell on said cylindrical housing adjacent said second shoulder, said disc-shaped shell having a peripheral surface that engages said second bead on said first diaphragm assembly, said first and second diaphragm assemblies, sleeve, cylindrical housing and disc-shaped shell defining a second chamber;

attaching a fastener to said cylindrical housing which engages said disc-shaped shell; and applying a force to move said fastener and overcome said return spring to allow said peripheral surface on said disc-shaped shell to compress said second bead on said first diaphragm assembly against said flange on said cup-shaped shell and effectively sealing said first and second chambers from the surrounding environment.

2. The method of assembly of a fluid pressurizing apparatus, as recited in claim 1 wherein said step of securing the first end of the sleeve to the hub member includes the step of:

snapping a lip on the sleeve onto the peripheral surface of the hub member, said return spring acting on the diaphragm assembly to urge the diaphragm assembly toward said disc-shaped shell, said return spring acting through the sleeve and lip connection to move the hub and second diaphragm assembly toward said disc-shaped shell.

3. The method of assembling a fluid pressurizing apparatus, as recited in claim 1, wherein said applying of the force to the fastener includes the step of:

rotating a nut to bring a rib on the end wall of the disc-shaped shell into engagement with said second shoulder on said cylindrical housing, said distance between said first and second shoulders being less than the free height of the cup-shaped shell, second bead and disc-shaped shell such that the engagement of the rib on the second shoulder by the nut places the cup-shaped and disc-shaped shells in compression sufficient to seal the first and second chambers from the surrounding environment.

4. In a fluid pressurizing device having a piston assembly located in an operational bore of a first housing, a movable wall located in a second housing formed by connecting a first shell to a second shell, said second housing being connected to said first housing, linkage for connecting said movable wall to said piston assembly, and a valve responsive to an input force for controlling the flow of fluid to the second housing to create a pressure differential across the movable wall, said pressure differential acting on said movable wall to produce an output force, said output force acting on said linkage to move said piston assembly and develop an output fluid pressure, characterized by the first housing having a substantially cylindrical projection that extends through said second housing, said cylindrical projection having a bore that extends from the operational bore, a peripheral surface with a first shoulder separated from a second shoulder, a second shoulder, a plurality of slots that extend from adjacent said first shoulder to substantially the center of said second housing, and threads that extend from an end of the cylindrical projection to adjacent said second shoulder; and a fastener engaging said threads to urge said first shell against said first shoulder and said second shell against said second shoulder and place said first and second shells in compression between the first and second shoulders to seal said second housing from the surrounding environment.

5. In the fluid pressurizing device as recited in claim 4 wherein said movable wall includes:

a hub member located in said cylindrical bore with peripheral surfaces that extend through the plurality of slots and above the cylindrical projection;

a sleeve that engages said peripheral surfaces;

a first diaphragm assembly that has a first bead located between the ends of the first and second shells and a second bead located in a groove on the sleeve; and a second diaphragm assembly that has a third bead connected to said sleeve and a fourth bead located in a groove in the cylindrical projection, said first and second diaphragm assemblies, sleeve and cylindrical projection cooperating with the first and second shell to define first and second chambers within the second housing.

6. In the fluid pressurizing device as recited in claim 5 wherein said valve includes:

a cylindrical body that has a guide surface that engages a wall of said cylindrical bore of the cylindrical projection, said cylindrical body being fixed to said hub member to hold the hub member in the cylindrical bore.

7. In the fluid pressurizing device, as recited in claim 6 wherein said linkage includes:

a push rod having a first end that extends through an opening in said hub member into engagement with said piston assembly and a second end encapsulated between said hub member and cylindrical body, said second end engaging a disc mechanism through which a reaction from the piston assembly is transferred to balance an input force from an operator.

8. In the fluid pressurizing device, as recited in claim 7 wherein said fastener includes:

a first nut that mates with the threads on said cylindrical projection to position said second shell against said second shoulder; and a second nut that mates with the threads on said cylindrical projection and engages a mounting surface for positioning the fluid pressurizing device in a fixed position.

* * * * *